(12) United States Patent
Weyhrich

(10) Patent No.: US 6,758,508 B2
(45) Date of Patent: Jul. 6, 2004

(54) EXTENSIBLE CARGO RACK FOR VEHICLE BED

(76) Inventor: Richard L. Weyhrich, Tube Specialties, Inc. 1459 NW. Sundial Rd., Troutdale, OR (US) 97060

(*) Notice: Subject to any disclaimer, the term of this patent is extended or adjusted under 35 U.S.C. 154(b) by 0 days.

(21) Appl. No.: 10/286,168

(22) Filed: Oct. 31, 2002

(65) Prior Publication Data

US 2004/0084919 A1 May 6, 2004

(51) Int. Cl.[7] ............................................. B62D 33/08
(52) U.S. Cl. ........................ 296/26.09; 296/26.1; 296/3; 296/100.18
(58) Field of Search ..................... 296/26.09, 3, 37.6, 296/165, 10, 100.01, 100.07, 40, 118; 414/462, 522; 224/402, 403, 542, 570, 543, 568

(56) References Cited

U.S. PATENT DOCUMENTS

| | | | | |
|---|---|---|---|---|
| 179,244 | A | * 6/1876 | Whitney | 296/26.09 |
| 1,309,251 | A | * 7/1919 | Lakin | 296/26.09 |
| 2,284,419 | A | * 5/1942 | Greg | 296/26.09 |
| 2,784,027 | A | * 3/1957 | Temp | 296/26.09 |
| 2,852,303 | A | * 9/1958 | Hopson | 296/26.09 |
| 3,726,422 | A | * 4/1973 | Zelin | 296/26.09 |
| 4,469,257 | A | * 9/1984 | Parker | 224/403 |
| 4,950,123 | A | * 8/1990 | Brockhaus | 296/26.09 |
| 4,989,768 | A | * 2/1991 | McNulty | 296/3 |
| 5,064,335 | A | * 11/1991 | Bergeron et al. | 296/26.09 |
| 5,098,146 | A | * 3/1992 | Albrecht et al. | 296/26.09 |
| 5,127,697 | A | * 7/1992 | St. Marie | 296/26.09 |
| 5,301,765 | A | * 4/1994 | Swanson | 296/26.09 |
| 5,472,301 | A | * 12/1995 | Wallen | 410/151 |
| 5,513,941 | A | * 5/1996 | Kulas et al. | 296/26.09 |
| 5,544,998 | A | * 8/1996 | Malinowski | 296/26.09 |
| 5,564,767 | A | * 10/1996 | Strepek | 296/26.09 |
| 5,584,521 | A | * 12/1996 | Hathaway et al. | 296/3 |
| 5,820,190 | A | * 10/1998 | Benner | 296/26.09 |
| 5,829,945 | A | * 11/1998 | Stanley | 296/26.09 |
| 5,915,773 | A | * 6/1999 | Deutsch et al. | 296/26.1 |
| 5,934,725 | A | * 8/1999 | Bowers | 296/26.09 |
| 5,938,262 | A | * 8/1999 | Mills | 296/26.09 |
| 5,988,722 | A | * 11/1999 | Parri | 296/26.09 |
| 6,024,402 | A | * 2/2000 | Wheatley | 296/100.18 |
| 6,059,339 | A | * 5/2000 | Madson | 296/26.09 |
| 6,065,792 | A | * 5/2000 | Sciullo et al. | 296/26.09 |
| 6,120,075 | A | * 9/2000 | Terry | 296/26.09 |
| 6,217,102 | B1 | * 4/2001 | Lathers | 296/100.07 |
| 6,244,646 | B1 | * 6/2001 | Wheeler, III | 296/26.09 |
| 6,250,702 | B1 | * 6/2001 | Eipper | 296/26.09 |
| 6,283,526 | B1 | * 9/2001 | Keough et al. | 296/26.09 |
| 6,312,034 | B1 | * 11/2001 | Coleman et al. | 296/26.09 |
| 6,318,780 | B1 | * 11/2001 | St. Aubin | 296/26.09 |
| 6,332,638 | B1 | * 12/2001 | Menna | 296/26.1 |
| 6,394,326 | B1 | 5/2002 | Lanier | |
| 6,398,283 | B1 | * 6/2002 | Knudtson et al. | 296/26.09 |
| 6,457,619 | B1 | 10/2002 | Werner et al. | |
| 6,464,274 | B2 | * 10/2002 | Mink et al. | 296/26.09 |
| 6,491,331 | B1 | * 12/2002 | Fox | 296/26.09 |
| 6,516,983 | B2 | * 2/2003 | Sotiroff et al. | 224/281 |

FOREIGN PATENT DOCUMENTS

JP    2 241848    * 9/1990

* cited by examiner

Primary Examiner—Kiran Patel
(74) Attorney, Agent, or Firm—Marger Johnson & McCollom, PC

(57) ABSTRACT

A storage apparatus includes a frame suitably shaped to fit within the confines of a vehicle bed. One or more securing members are structured to engage the frame and a surface of the vehicle bed to hold the frame in a fixed relationship relative to the vehicle. The apparatus is designed to be non-invasively installed in the vehicle bed, i.e. without modification to the bed such as drilling or cutting. A cargo tray unit is structured to slide relative to the frame, being rearwardly extensible from the vehicle bed.

11 Claims, 5 Drawing Sheets

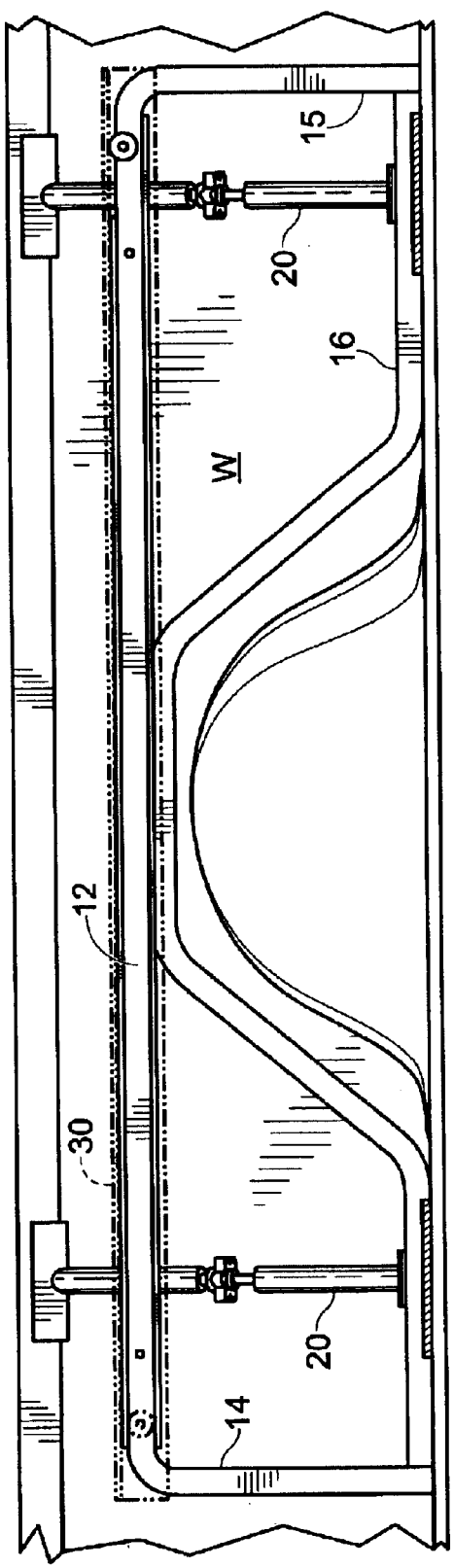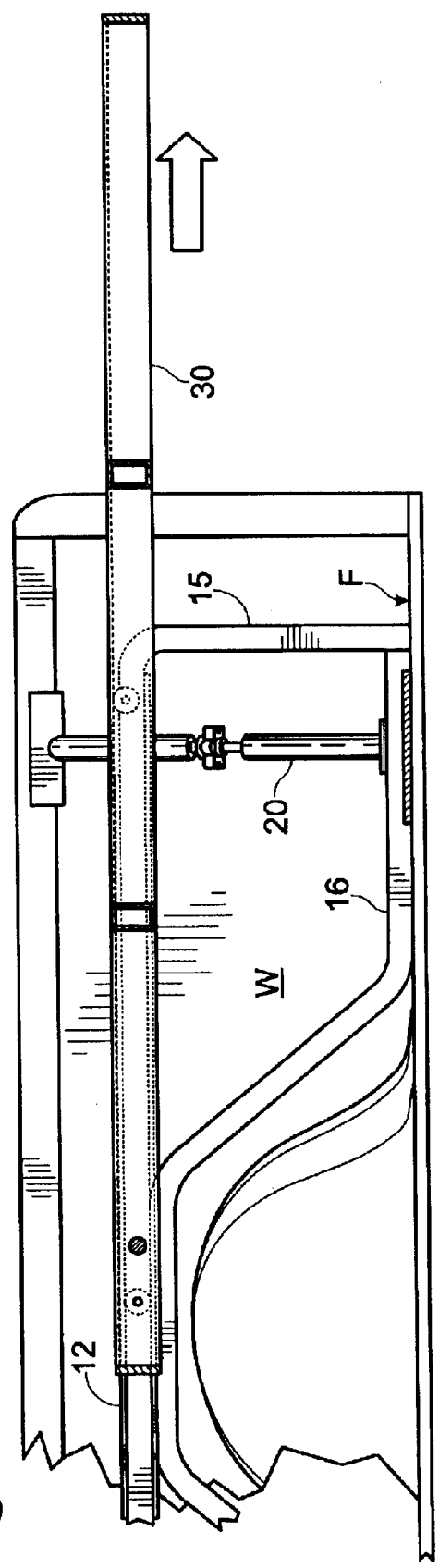
Fig. 2A
Fig. 2B

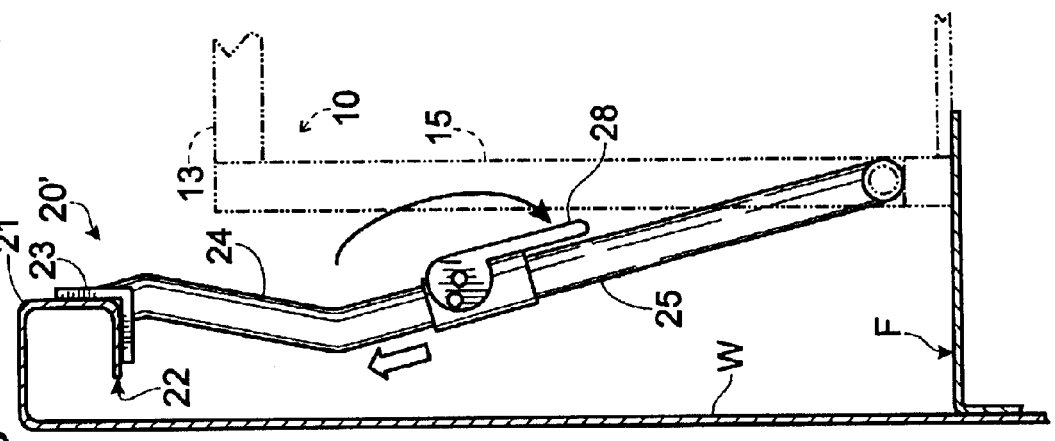
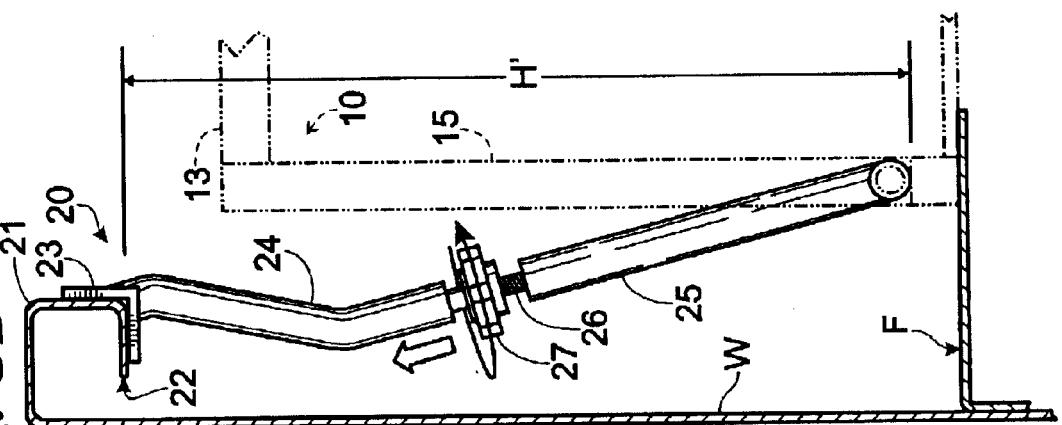
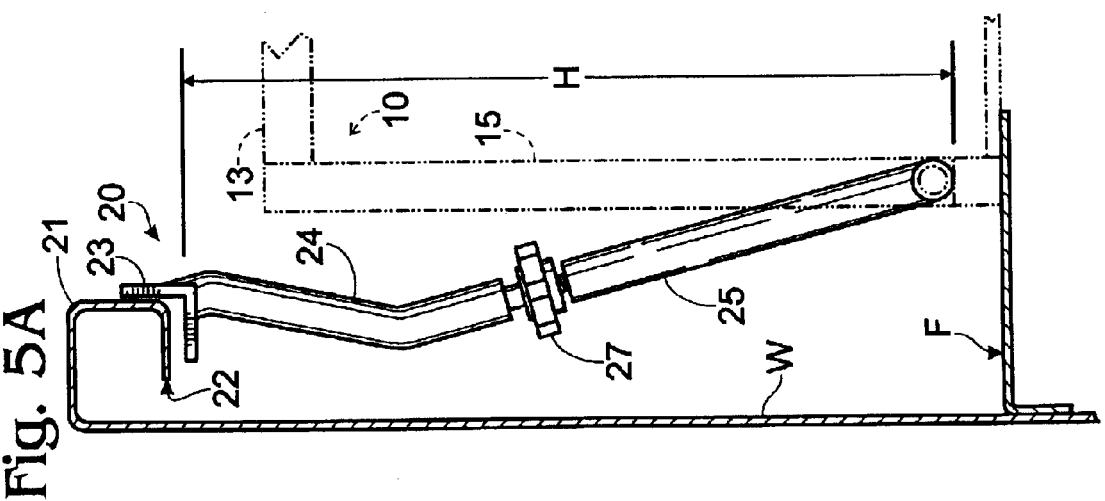

EXTENSIBLE CARGO RACK FOR VEHICLE BED

BACKGROUND OF THE INVENTION

The disclosure is related to the field of cargo racks, and more specifically to an extensible cargo rack adapted for use in a pickup truck bed.

Pickup trucks generally include a cab and a truck bed, the latter ideally suited for portage of heavy, bulky or messy items. For such reason, pickup trucks are popular for use in construction and sporting applications, e.g., motorsports, camping and fishing.

The use of a cargo rack for pickup trucks is known in the prior art. A wide variety of aftermarket accessories exist to increase pickup truck versatility, including bike racks, tool beds, equipment racks, ladder racks, and so on. While these devices fulfill their respective, particular objectives and requirements, the aforementioned devices generally suffer in that usable cargo volume in the truck bed is reduced. In some cases, the cargo rack is mounted directly to the bed floor, precluding use of the floor for portage of large items such as plywood sheets. Still other devices place cargo above the bed but in positions where it is less conveniently accessed.

Embodiments of the invention address the above limitations of the prior art.

BRIEF DESCRIPTION OF THE DRAWINGS

The extensible cargo rack disclosed herein will become more readily apparent from the following detailed description, which proceeds with reference to the drawings, in which:

FIG. 2A is a cutaway side view of the truck bed of FIG. 1C, showing the storage apparatus non-invasively secured therein.

FIG. 2B is an enlarged rear view of the apparatus and truck bed of FIG. 2A, showing the cargo tray of the apparatus in an extended position.

FIGS. 5A and 5B are enlarged views of the storage apparatus of FIGS. 1–4, showing in more detail the securing member.

FIG. 5C is a side view of an alternative securing member for the cargo apparatus of FIGS. 1–4.

DETAILED DESCRIPTION OF PREFERRED EMBODIMENT(S)

Accordingly, the need has arisen for a cargo rack adapted to be mounted within a truck bed so as to maximize usable bed volume and to provide ease of access to cargo either within the truck bed and on the cargo rack. In these respects, the extensible cargo rack according to the present disclosure substantially departs from the conventional concepts and designs of the prior art.

Figure 1A:
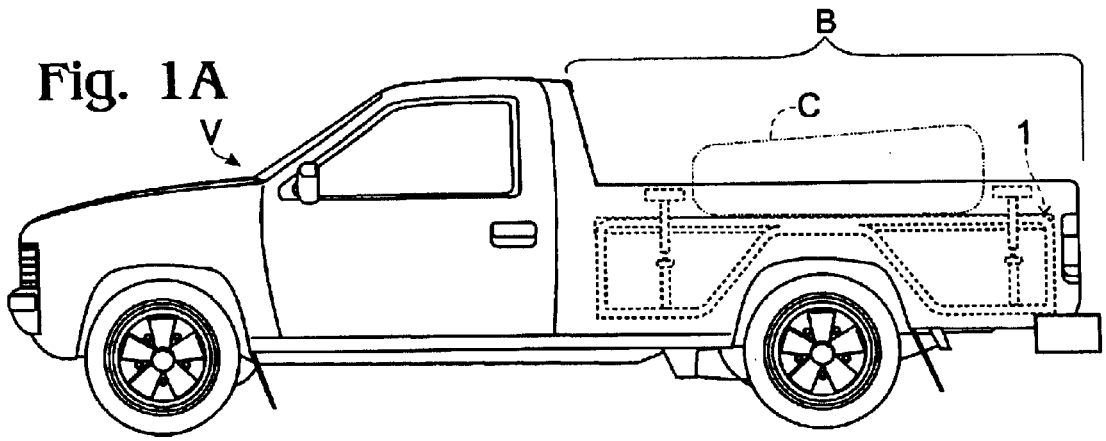
FIG. 1A is a side view of a pickup truck with a storage apparatus installed in the bed thereof and with a storage container mounted to the apparatus.
Figure 1B:
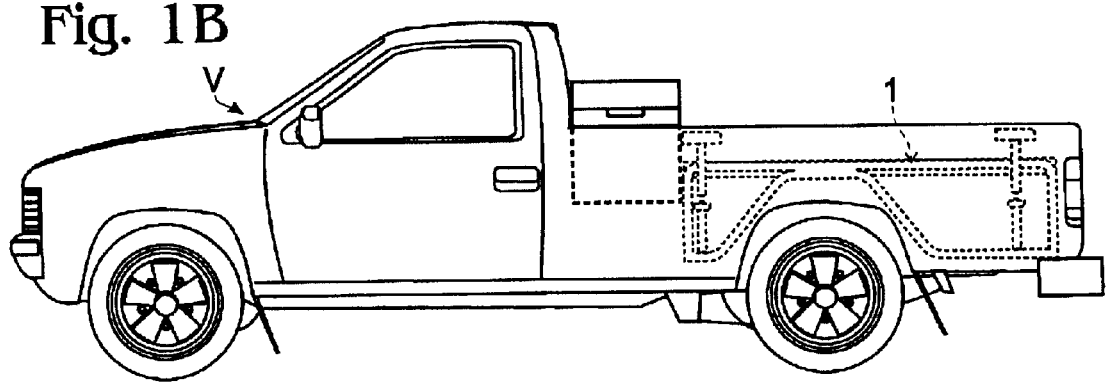
FIG. 1B is a side view of the truck and storage apparatus as shown in FIG. 1A, showing a tool case mounted in the truck bed.
Figure 1C:
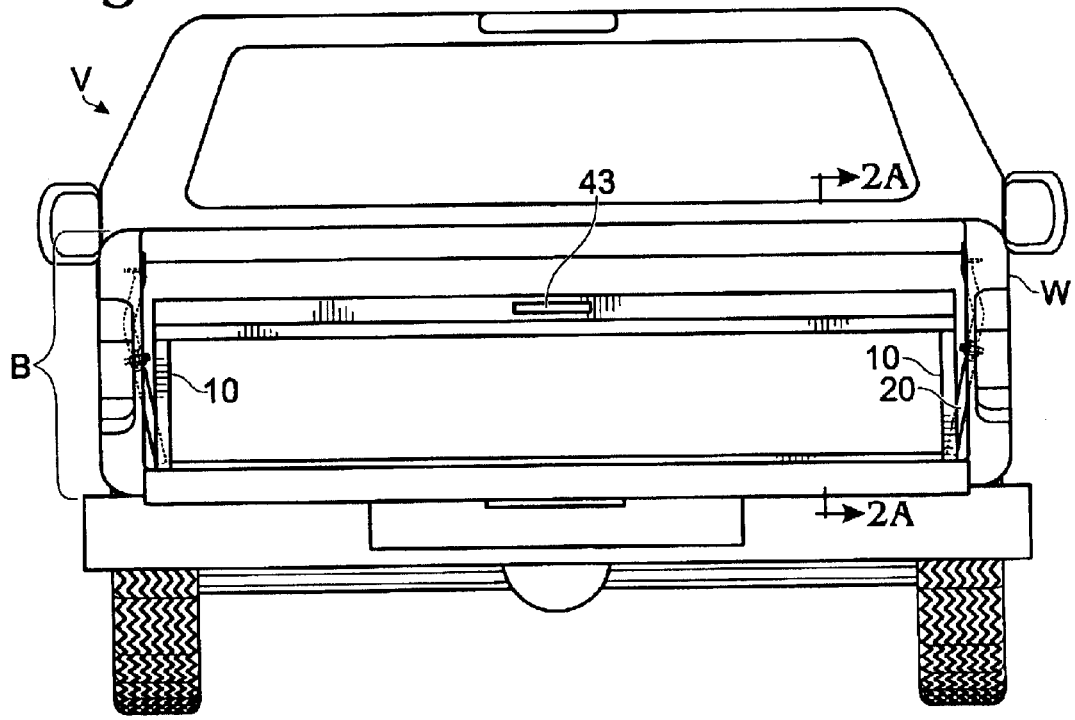
FIG. 1C is a rear view of a truck bed (tailgate removed) showing a storage apparatus installed therein.

Looking first at FIGS. 1A–1C, a cargo apparatus 1 as disclosed herein is mounted in a pickup truck or other vehicle V having a cargo bed B. The cargo apparatus includes a frame 10, a tray 30 slidably coupled to the frame 10, and securing members 20 to fasten the frame 10 to the vehicle bed B.

In the embodiment of the cargo apparatus 1 shown in greater detail in FIGS. 2A–2B, the frame 10 is suitably shaped to fit within the confines of the vehicle bed B and so mounted. The frame 10 is structured to support the cargo tray 30 in an elevated position relative to a floor F of the bed B.

The frame preferably are structured to be positioned substantially parallel to side walls W of the bed B, with at least a portion of lateral frame members 12 preferably are positioned in an elevated arrangement relative to a bed floor F. The support members are shaped so as not to cause interference with protrusions of the vehicle within the frame when the frame is mounted in the vehicle bed.

In the embodiment shown, the frame is comprised of two lateral frame members 12, one residing along each side wall W of the vehicle bed B. Frame 10 has at least one crossbrace 13 coupled between the first and second frame member 12.

Each lateral frame member 12 is a relatively straight elongated member further including two or more coupling members 14,15 structured to be coupled to the straight elongated member, and a second elongated member 16 structured to be connected to the coupling members 14,15, the second elongated member 16 generally shaped so as to not contact a wheel well of the vehicle V when the frame 10 is mounted to the vehicle. The second elongated member 16 preferably is substantially straight save for the portion avoiding contacting with the wheel well, although more arcuate embodiments also can be employed.

The frame members 12 can be of a unitary tubular construction; for instance, the relatively straight elongated member 12, two or more coupling members 14,15, and the second elongated member 16 would be considered as a unitary frame member 12.

Securing members 20 serve to fasten the frame 10 to the vehicle bed B. One or more securing members 20 are structured to engage the frame 10 and a surface 22 of the vehicle bed B to hold the frame 10 in a fixed relationship relative to the vehicle V. The securing members 20 preferably are structured to non-invasively engage the surface 22 of the vehicle.

In a most preferred embodiment, the securing members 20 non-invasively fasten the frame 10 in the bed B. In one embodiment, this is accomplished by engagement of the securing members 20 with inner lip 21 of the vehicle bed B, preferably at an underside 22 of the inner lip 21.

As shown in FIGS. 2B and 5A–5C, the securing members 20 are extensible. By positioning the securing members 20 as shown in FIGS. 5A–5B, the frame 10 can be fastened to the vehicle V via a compression fastening. That is to say, extension of the securing member 20 while a first end 23 thereof is braced against the inner lip 22 of the side wall W of the bed B produces a downward force. This downward force urges the frame 10 against the floor F of the bed B, securing the frame 10 therein. Of course, the foregoing compression fastening can be described in terms of bracing of a lower end of the securing member 20 and application of an upward force to urge the upper end of the member 20 against the inner lip 22 of the bed.

The above-described compression fastening can be accomplished in numerous ways. For example, the securing members can comprise a height H, a first segment 24, and a second segment 25. The second segment 25 is threadedly coupled to the first segment 24 and structured to, upon rotation, increase or decrease the height H of the securing member 20.

In the embodiment shown in FIGS. 5A–5B, the securing members can include a height H, a first segment 24, and a second segment 25 coupled to the first segment 24 and having a threaded portion 26. A rotable collar 27 is coaxially coupled to the threaded portion 26 of the second segment 25 and structured to, upon rotation, increase or decrease the height H of the securing member 20.

An alternative embodiment of the securing member 20, shown in FIG. 5C, includes a lever 28 structured to, when pivoted, positively or negatively alter the height H of the securing member 20.

The cargo tray unit (30 in FIG. 3A) is sized to fit in the vehicle bed B and structured to slide relative to the frame 10. The tray 30 preferably is positioned in an elevated arrangement relative to the floor F of the bed B.

The tray unit 30 is further structured to have mounted thereto a variety of cargo devices. For example, a cargo container (C in FIG. 1A) can be mounted to the cargo tray to provide enclosed and/or lockable storage capacity outside the cab or passenger area of the vehicle. Other specialized equipment racks, providing for the attachment of specific gear, can be efficaciously mounted. Examples include a set of bicycle carrier clamps, ski and/or snowboard carriers, off-road motorcycles, and boats and rafts, and the like.

Figure 4A:
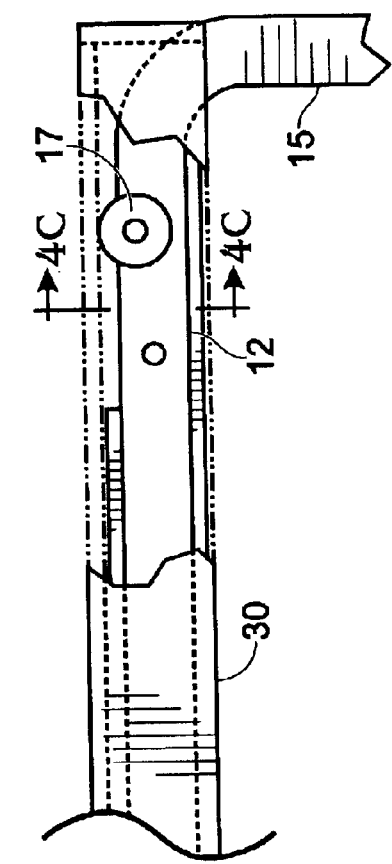
FIG. 4A is a side view of one embodiment of a slider mechanism coupling a cargo tray to a lateral frame member.
Figure 4C:
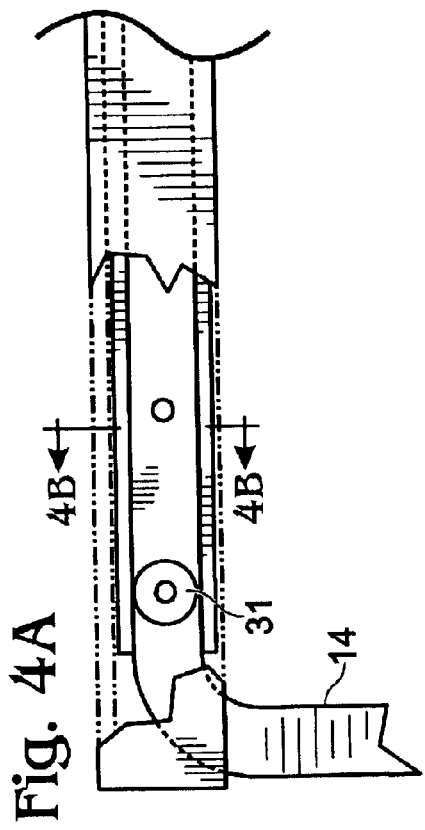
FIGS. 4B and 4C are enlarged end views of front and rear slider mechanisms, respectively, of FIG. 4A.
Figure 4B:
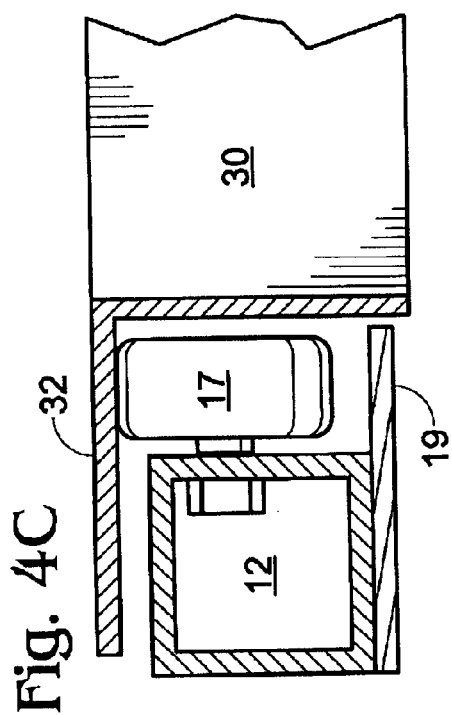
Figure 4C:
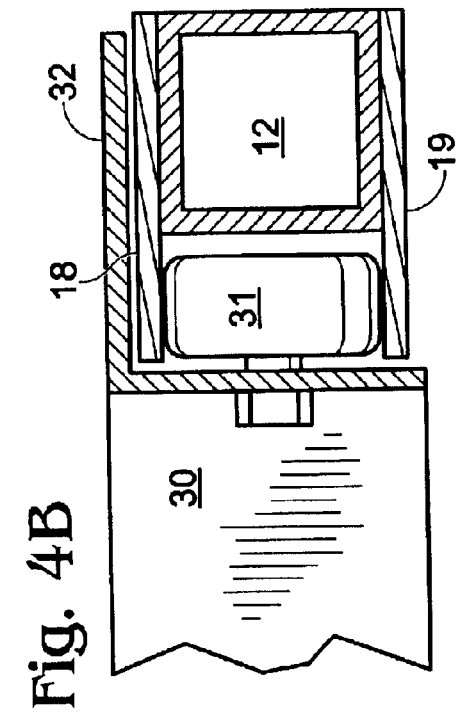

The cargo tray 30 is slidably coupled to the frame 10. As shown in FIGS. 4A–4C, roller wheels can be utilized. In more detail, the frame 10 has wheels 17 fixedly mounted thereto and structured to contact the tray unit 30. As shown, the tray unit 30 also includes wheels 31.

FIG. 4B illustrates the arrangement of the frame 10, tray 30 and tray-mounted roller 31 at the front end of the cargo apparatus 1. The frame 10 includes an upper flange 18 and a lower flange 19 that confine tray-mounted roller 31. Flanges 18,19 extend substantially the length of the lateral frame members, providing a rolling track for the roller 31.

In FIG. 4C, a frame-mounted roller 17 is shown. A tray flange 32 resides above the frame-mounted roller 17 and provides a contact surface therefor. The frame-mounted roller 17 need not be vertically confined by a companion flange on the lower edge of the tray 30. Gravity and the weight of the tray unit 30 serve to maintain it in contact with the frame-mounted roller 17.

As can be seen in FIGS. 4A and 4C, upper flange 18 preferably does not extend the entire length of the frame, but terminates a short distance before the rear frame end. The tray 30 thereby can be detached from the frame 10 by positioning the tray-mounted wheel 31 at the rear frame end of the rolling track and lifting the tray-mounted wheel 31 upward and out of the track.

Of course, other assemblies can be envisioned to provide a slidable coupling of the tray 30 and the frame 10. For example, a series of rollers can be used, and rollers can be mounted on only one of the frame or tray unit. Ball bearings can be employed in place of rollers, or the tray can be slid along the frame without benefit of friction-reducing components. The tray and frame can utilize a nested tube arrangement (i.e., similar to a trombone slide).

The storage apparatus further comprises a retaining member or locking mechanism, structured to retain the cargo rack in a selected extension position or, more preferably, in any of a plurality of predetermined extension positions. A locking mechanism can be provided to prohibit the tray unit from sliding relative to the frame. The locking mechanism can be selectively engageable, permitting a user to locate and lock the tray in any desired position.

Figure 3A:
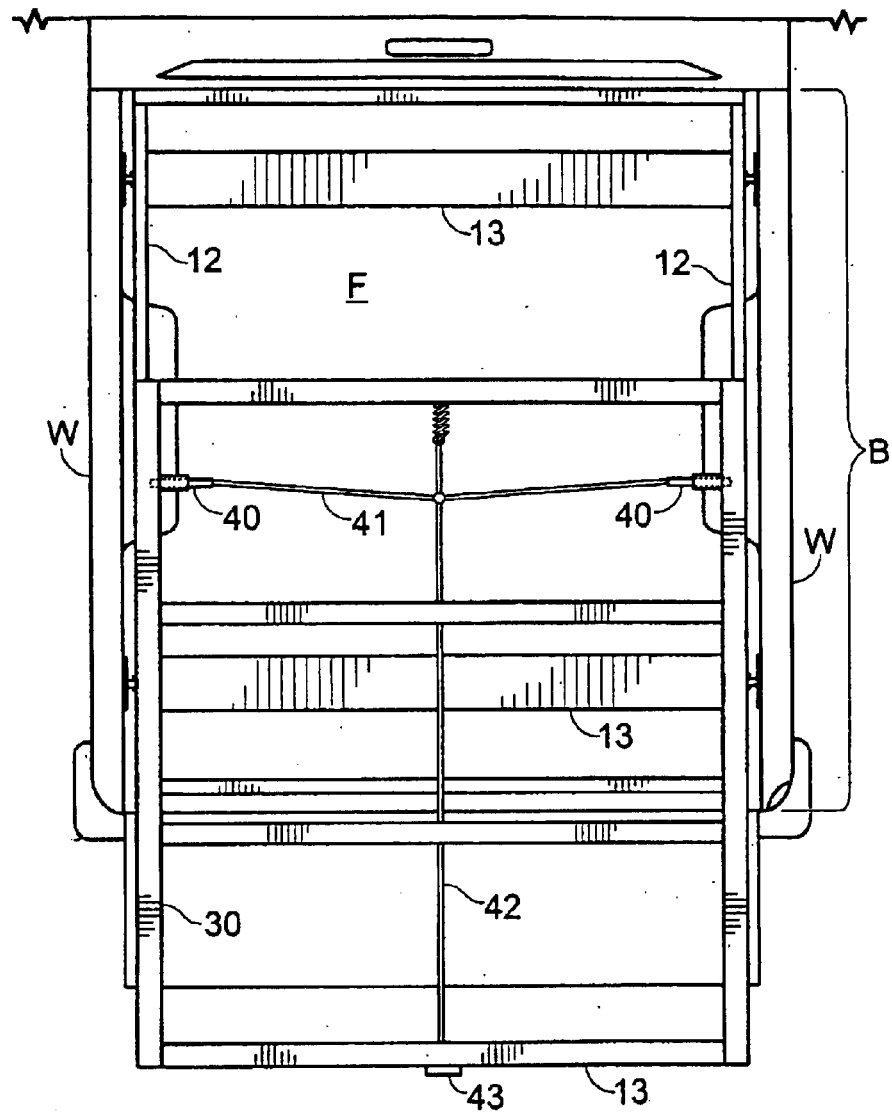
FIGS. 3A and 3B are top views of a truck bed and apparatus therein, showing a latch mechanism of the apparatus.
Figure 3B:
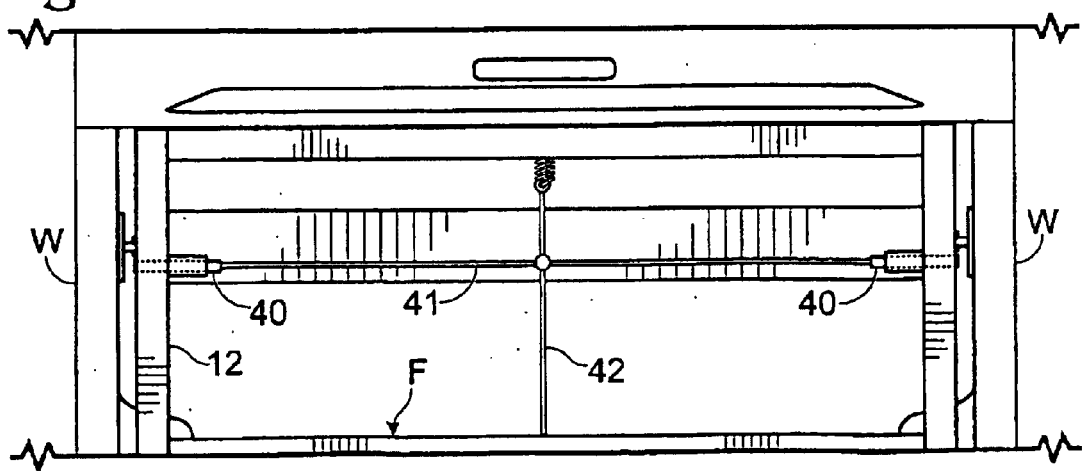

FIGS. 3A–3B shows more clearly the latching mechanism of the cargo apparatus of FIGS. 1–4, comprising a pair of locking pins 40 mounted to the tray 30. The locking pins 40 are outwardly-biased and engage recesses (not visible) in the frame 10.

In the embodiment shown, the lacking pins 40 are connected by a lock cable 41. A release cable 42 connects the first cable 41 with a release handle 43 at the rear of the frame 10.

The tray 30 can be unlocked by manipulation of the release handle 43. Tension on the release cable 42 flexes the lock cable 41 and retracts the locking pins 40 from the recesses. Movement of the tray unit 30 is then permitted, i.e., extension of the tray rearward from the vehicle.

Additional recesses preferably are provided at predetermined locations in the frame 10, permitting the tray 30 to be locked in any one of a plurality of selected positions. Alternatively or additionally, recesses can be enabled by a user, to customize the apparatus to the user's specific application.

It is readily understood by one of skill that numerous methods can be employed for locking the tray unit in a desired position, such as pins, knobs, clamps, biased devices, friction and so on.

The cargo apparatus as disclosed herein provides several unique and advantageous features. In the first instance, conventional storage racks typically are mounted to the bed of the vehicle, eliminating the bed floor from use in cargo storage. In contrast, the present storage apparatus preserves bed volume (defined by a floor of the vehicle bed, walls of the vehicle bed and a bottom surface of the cargo tray) as substantially free of cargo apparatus elements and therefore available for cargo storage.

As well, traditional racks mounted in or above the vehicle bed require the user to reach over the side wall of the bed. Some items therefore are out of reach of users. Further, users are forced to lean against the side wall, which may have moisture or dirt adherent thereto. Reaching over the side walls also places strain on the body and can lead to injuries when heavy items are improperly lifted.

The slidability possessed by the tray unit 30 as described herein provides convenient access to items stored on the tray. The tray 30 is extended rearward from the vehicle, permitting easy access from either side of the tray.

A further benefit of the present apparatus is that it can be installed without modification to the vehicle. Utilizing a compression-type clamping, the non-invasive securing members fasten the apparatus within the vehicle bed without need for mounting bolts or drilled holes. The apparatus therefore can be simply removed or transferred from one vehicle to another.

The removable tray also can be structured for attachment to a roof rack of a passenger car, sport-utility or other vehicle. This embodiment permits the tray to be removed from the apparatus and attached to another vehicle having a conventional roof rack.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While embodiments of the invention have been disclosed in specific forms, the specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and sub combinations of the various elements, features, functions and/or properties disclosed herein.

What is claimed is:

1. A storage apparatus for a vehicle bed, comprising:
    a pair of lateral frame members and a pair of second elongated members partially elevated above the rear wheel well;
    substantially vertically oriented pair of securing members coupled to the second elongated member and upper anchoring points, said securing members structured to exert a downward force on the second elongated member to non-invasively fasten said second elongated member to the vehicle;
    a cargo rack slidably coupled to the lateral frame member; and
    wherein the cargo rack is elevated above the bed floor sufficient to permit cargo to be placed between the bed floor and the cargo rack.

2. The storage apparatus of claim 1 wherein the lateral frame members are structured to be positioned substantially parallel to side walls of the bed.

3. The storage apparatus of claim 1 wherein the cargo rack is slidably coupled to the lateral frame members.

4. The storage apparatus of claim 1 wherein the cargo rack is adapted to be positioned in an elevated arrangement relative to a floor of the bed.

5. The storage apparatus of claim 1 wherein the cargo rack is further structured to have mounted thereto a first cargo container.

6. The storage apparatus of claim 1, further comprising a retaining member structured to retain the cargo rack in a selected extension position.

7. The storage apparatus of claim 1 wherein the retaining member is structured to retain the cargo rack in one of a plurality of predetermined extension positions.

8. The storage apparatus of claim 1 wherein each support leg comprises:
    a lower leg segment having a foot structured to contact a lateral frame member;
    an upper leg segment having a band structured to contact an underside of a vehicle bed lip; and
    a turnbuckle threadedly coupling the lower leg segment and upper leg segment to provide extension or retraction of said segments along a longitudinal axis of said segments.

9. The storage apparatus of claim 1 wherein each support leg comprises:
    a lower leg segment having a foot structured to contact the bed floor;
    an upper leg segment having a hand structured to contact an underside of a vehicle bed lip; and
    a turnbuckle threadedly coupling the lower leg segment and upper leg segment to provide extension or retraction of said segments along a longitudinal axis of said segments.

10. The storage apparatus of claim 1 wherein each support leg comprises:
    a lower leg segment having a foot structured to contact a lateral frame member;
    an upper leg segment having a hand structured to contact an upper anchoring point; and
    a turnbuckle threadedly coupling the lower leg segment and upper leg segment to provide extension or retraction of said segments along a longitudinal axis of said segments.

11. The storage apparatus of claim 1 wherein each support leg comprises:
    a lower leg segment;
    a upper leg segment threadedly coupled to the first segment; and
    a rotatable collar structured to, upon rotation, provide extension or retraction of the lower leg segment relative to the upper leg segment.

* * * * *

UNITED STATES PATENT AND TRADEMARK OFFICE
CERTIFICATE OF CORRECTION

PATENT NO. : 6,758,508 B2
DATED : July 6, 2004
INVENTOR(S) : Weyhrich

It is certified that error appears in the above-identified patent and that said Letters Patent is hereby corrected as shown below:

<u>Title page,</u>
Item [56], References Cited, U.S. PATENT DOCUMENTS, "2,284,419 A * 5/1942 Greg" should read -- 2,284,419 A * 5/1942 Greig --.

<u>Column 2,</u>
Line 28, "frame member 12" should read -- frame members 12 --.

<u>Column 3,</u>
Line 14, "A rotable collar" should read -- A rotatable collar --.
Line 44, "confine tray-mounted" should read -- confine the tray-mounted --.

<u>Column 4,</u>
Line 16, "the lacking pins 40" should read -- the locking pins 40 --.

<u>Column 6,</u>
Line 8, "a band structured" should read -- a hand structured --.

Signed and Sealed this

Eighth Day of February, 2005

JON W. DUDAS
*Director of the United States Patent and Trademark Office*